United States Patent [19]

Westergaard

[11] 3,809,083

[45] May 7, 1974

[54] TOOL FOR ADMINISTERING INJECTIONS TO LIVESTOCK

[76] Inventor: Melvin George Westergaard, 5304-121 Ave., Edmonton, Alberta, Canada

[22] Filed: July 13, 1972

[21] Appl. No.: 271,583

[52] U.S. Cl. ............................................ 128/218 F
[51] Int. Cl. ............................................ A61m 5/20
[58] Field of Search .......... 128/218 F, 215, 218 PA, 128/218 R, 218 A, 218 D, 220, 216

[56] References Cited
UNITED STATES PATENTS

| 3,430,626 | 3/1969 | Bergman | 128/218 F |
| 3,114,370 | 12/1963 | Kayler | 128/218 F |
| 3,702,608 | 11/1972 | Tibbs | 128/218 F |

FOREIGN PATENTS OR APPLICATIONS

| 866,829 | 12/1952 | Germany | 128/215 |
| 505,931 | 5/1920 | France | 128/218 F |

Primary Examiner—Richard A. Gaudet
Assistant Examiner—J. C. McGowan
Attorney, Agent, or Firm—Ernest Peter Johnson

[57] ABSTRACT

The tool includes a long handle carrying a syringe at one end. A spring-biased carriage moves longitudinally along the handle to push the syringe plunger from the loaded position to the discharged position. A catch holds the carriage at the loaded position. A lever is provided to release the catch; the end of the lever is positioned adjacent the tip of the syringe needle. When the needle is jabbed into the animal, the lever is biased rearwardly and releases the catch so that the carriage moves to discharge the syringe contents. The tool enables the stockman to quickly administer an injection to an animal from a distance of 5 or 6 feet.

2 Claims, 4 Drawing Figures

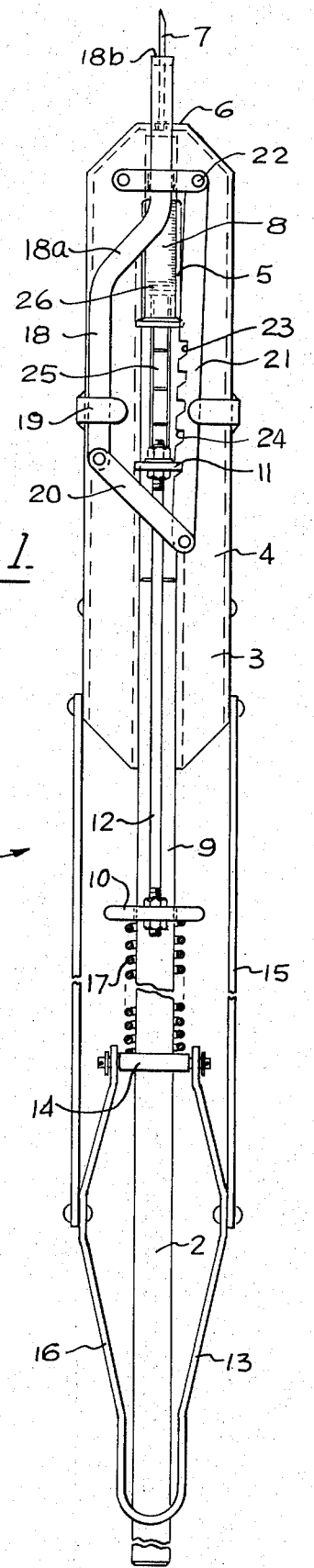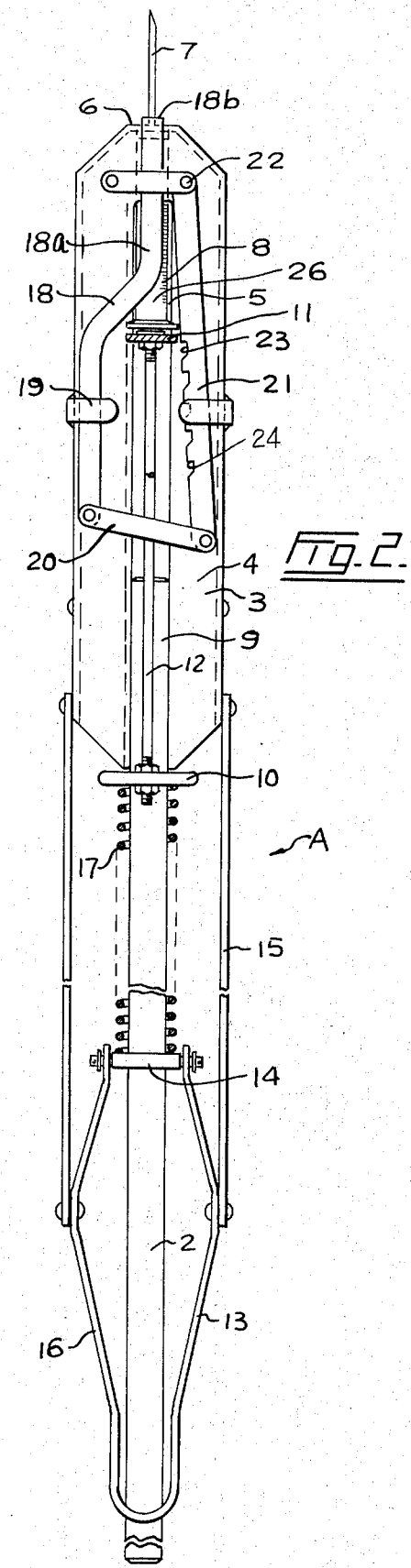

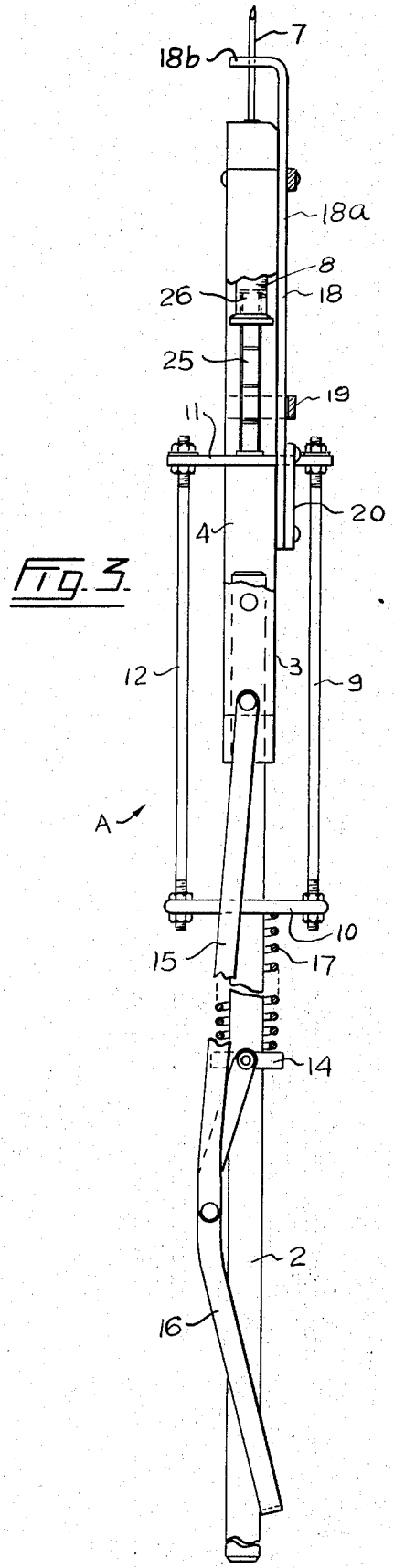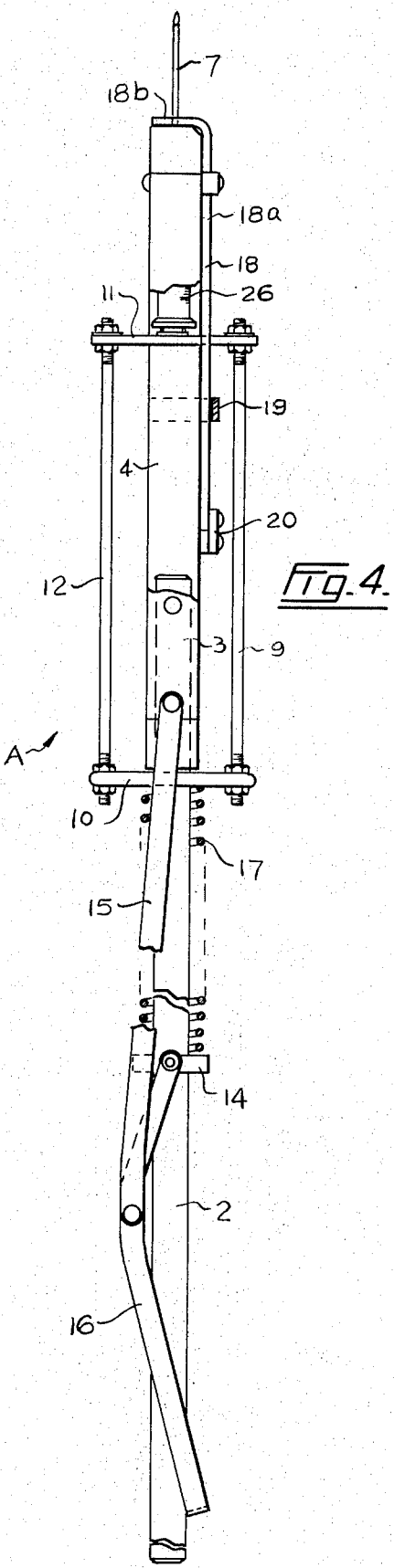

3,809,083

TOOL FOR ADMINISTERING INJECTIONS TO LIVESTOCK

BACKGROUND OF THE INVENTION

This invention pertains to a tool for administering injections to livestock.

When giving injections to cattle and the like, it is usual to pen the animal to be treated in a chute or like structure in order to hold it immobilized while the injection is administered. One disadvantage of this system is that a considerable amount of time is wasted by the stockman in penning up the animal. It would be advantageous if the stockman could carry out the operation in the pasture or corral; however, it is difficult to get close enough to the animal for the needed time in order to administer the injection by hand.

SUMMARY OF THE INVENTION

It is therefore one object of this invention to provide a tool which can be used to administer an injection to an animal from a distance in the order of 5 or 6 feet.

It is another object to provide a tool which is automatically triggered as the syringe needle enters the animal.

It is another object to provide a tool which discharges the syringe contents very quickly so that the animal barely begins to react before the injection is complete.

It is another object to provide a tool which is rugged and simple to repair.

It is another object to provide a tool having an open framework so that disposable syringe cartridges may easily be loaded or unloaded into or out of the tool.

It is another object to provide a spring-loaded tool having a compression lever for easily compressing the spring.

In accordance with the invention, a syringe is carried at the end of a long handle. The syringe is discharged by the movement of a spring-biased carriage which slides along the handle and pushes the syringe plunger into the barrel. Movement of the carriage is triggered by a lever which disengages a latch mechanism holding the drive spring in a compressed condition. The lever extends beyond the end of the handle to a point immediately behind the tip of the syringe needle. When the needle penetrates into the flesh of the animal, the lever also contacts it and simultaneously releases the latch and carriage. The spring expands very quickly and drives the carriage forward, thereby discharging the syringe. A lever is provided for compressing the spring to the cocked position, thereby ensuring that a strong spring can be used for rapid discharge.

The tool is characterized by several advantages. It enables the stockman to administer the injection to an animal with a quick jab of the tool from a distance of several feet. As a result, the animal does not have to be penned up beforehand. The discharge of the syringe contents automatically commences only when the needle tip has penetrated the animal's flesh, so that the dosage is not wasted. The syringe is emptied into the animal very quickly so that it cannot shy away before the injection is complete. The tool is mechanically simple and can be easily repaired with items which are normally available on farms and ranches, its open framework construction enables a disposable syringe to be used in conjunction with it. Another feature is the provision of a lever for compressing the spring, which enables one to use a strong enough spring in the tool to ensure that the syringe contents will be discharged at a rapid enough rate to empty the syringe before the animal shies away.

Broadly stated, the tool comprises: an elongate member adapted to hold a syringe at the first end thereof so that the needle of the syringe will extend beyond said first end; carriage means mounted on the member for sliding movement therealong between a first position, in which it engages the syringe plunger when the syringe is loaded, and a second position, in which it engages the plunger when the syringe is empty; biasing means, associated with the member, for moving the carriage means between the first and second positions so as to discharge the syringe; catch means, associated with the member, adapted to hold the carriage means in the first position; and movable lever means carried by the member and extending beyond the first end of the member so as to be adjacent to the tip of the syringe needle when it is in place, said lever means being adapted, when biased toward the member, to disengage said catch means to permit the biasing means to move the carriage and discharge the syringe.

DESCRIPTION OF THE DRAWING

In the drawing:

FIG. 1 is a plan view of the upper side of the tool in a cocked position showing a loaded syringe in place for discharging;

FIG. 2 is a view similar to that of FIG. 1 showing the tool after it has been tripped and the syringe contents discharged;

FIG. 3 is a side view of the tool in the cocked position; and

FIG. 4 is a side view of the tool in the discharged position.

DESCRIPTION OF THE PREFERRED EMBODIMENT

With reference now to FIGS. 1 and 2, the tool A includes an elongate member comprised of the handle 2 and frame 3. The frame 3 includes two parallel, spaced tubular members 4 which are attached to the front end of the handle 2 and define a syringe - holding cavity 5 between them. The members 4 are joined at their upper ends by the cross piece 6 which defines an aperture (not shown) through which the needle 7 of the syringe 8 extends.

A carriage 9 is mounted on the handle 2 for sliding movement therealong. The carriage 9 consists of an apertured collar 10 in place around the handle 2 and a cross piece 11 connected to the collar 10 by rigid spacer rods 12. The cross piece 11 is positioned within the cavity 5 at its rearward end and extends transversely thereacross.

A compression lever 13 is connected to an apertured collar 14 mounted on the handle 2 rearwardly of the collar 10. The lever 13 consists of a pair of first arms 15 pivotally attached at their forward ends to the members 4 and at their rearward ends to a pair of second arms 16. The second arms 16 are, in turn, pivotally attached to the collar 14. It is seen that, when the arms 16 are pivoted clockwise, the collar 14 is shifted forward toward the carriage 9. The lever 13 is formed to lock against the handle when fully pivoted, as shown in FIG. 3.

A coil spring 17 is threaded over handle 2 and extends between collars 10 and 14.

A release lever 18 is carried by the frame 3 at its forward end. The main body 18a of the lever 18 extends alongside the upper face of one of the frame member 4; the upper end 18b of the lever 18 is bent at 90° to provide a bearing surface extending transversely of the aperture of the cross piece 6. The lever end 18b has an aperture formed therethrough through which the needle 7 extends. As shown in FIG. 1, the bent end 18b is positioned just to the rear of the tip of the needle 7 when the tool A is cocked. The lever 18 is held in place by the brackets 19 but is free to slide longitudinally and rearwardly. An angularly - disposed linkage 20 pivotally connects the rear end of the lever 18 with the elongate catch member 21. The catch member 21 extends along an edge of the syringe-holding cavity 5. This catch member 21 is also pivotally connected at its upper end to the right hand frame member 4 by the screw 22. It is thus seen that longitudinal movement of lever 18 causes catch member 21 to swing about screw 22 in the plane in which the said member lies. Along its inner edge 22, a number of spaced notches 23 are defined by the catch member 21, to cooperate with the carriage collar 11 to hold it in the cocked position.

In operation, the user first loads the uncocked tool with a syringe. The syringe 8 is inserted into the cavity 5. The shoulder of the syringe seats in grooves cut in the inner wall of the frame members 4, to fix the syringe relative to the tool. The syringe is then loaded with a dosage by withdrawing the plunger and piercing a supply container with the needle. Once the syringe is loaded, the user then swings the catch member 21 inwardly and locates the carriage's front cross piece 11 opposite to the desired notch 23. The arms 16 of the compression lever 13 are then rotated rearwardly so as to draw collar 14 forwardly and compress spring 17. The forward end of spring 17 is fixed by carriage collar 10 since the cross piece 11 is now firmly seated against the notch shoulder 24 and the carriage 9 is thereby locked in place. At this stage, the carriage 9 is held by the catch member 21 in the first or syringe-loading position illustrated in FIG. 1. The dosage container (not shown) is then pierced with the syringe needle 7 and plunger 25 is extended until it abuts carriage cross piece 11 — the barrel 26 of the syringe 8 is thereby filled with the desired volume of liquid. (The notches 23 are set to coincide with commonly used dosage volumes). In this first position, it will be noted that the bent portion 18b of release lever 18 is located immediately to the rear of needle tip 26 and is spaced forwardly of frame cross piece 6. With the tool A cocked in this manner, the stockman approaches the animal and jabs it in the flank with the front end. As the needle 7 penetrates the animal's flesh the bent portion 18b of release lever 18 makes contact with the animal and is driven rearwardly. This causes the pivoted linkage 20 to rotate and drive the catch member 21 outwardly, thereby releasing the carriage cross piece 11. The carriage 9 is then free to slide longitudinally and is driven forward by expansion of the spring 17. The syringe plunger 25 is forced ahead by the carriage 9 and discharges the fluid in the barrel 26 almost instantaneously.

What is claimed is:

1. A tool for administering an injection to livestock comprising:

a handle having front and rear ends;

parallel, spaced frame members attached to the front end of the handle and extending forwardly therefrom to form a syringe-holding cavity between them;

carriage means mounted on the handle and extending into the cavity, said carriage means comprising a first collar member slidably mounted on the handle, a cross piece positioned transversely of the cavity, and means rigidly connecting the collar member and cross piece together, said carriage means being slidable along the handle between a first position, in which the cross piece engages the end of the plunger of the fully-loaded syringe when the tool is loaded therewith, and a second position, in which the cross piece engages the end of the plunger when the syringe is empty, a second collar member mounted on the handle rearwardly of said first collar member;

spring means mounted on the handle and extending between and engaging said first and second collar members;

compression lever means pivotally connected adjacent its front end to a said frame member and adjacent its rear end to said second collar member, said compression lever being adapted to be pivoted to slide the lever collar member forward toward the carriage means, thereby compressing the spring means, said compression lever being further adapted to lock said carriage means in place when the spring means is compressed;

lever means carried by a said frame member and extending beyond the front end thereof so as to be aligned with the handle and the needle of a syringe, when the tool is loaded, whereby the needle tip extends through and just past the lever means, said lever means being slidably movable along the frame portion; a catch member pivotally connected to another said frame member, extending along an edge of said cavity with means thereon for engaging said cross piece; and link means connecting the lever means and catch member in a manner whereby movement of the lever means disengages the catch member from the carriage corss piece to permit the spring means to move the carriage means between the first and second positions to discharge the syringe.

2. A tool as set forth in claim 1 wherein:

the compression lever means comprises a first lever pivotally attached adjacent its front end to a said frame member, a second lever pivotally attached at its rear end to the lever collar member and at its front end to the rear end of the first lever, said compression lever means being adapted to lock against the handle when the first and second levers are fully pivoted.

* * * * *